United States Patent [19]
Lynn et al.

[11] 3,883,234
[45] May 13, 1975

[54] COMPUTER CONTROLLED APPARATUS FOR AUTOMATIC VISUAL FIELD EXAMINATION

[76] Inventors: John R. Lynn, 10001 Preston Rd., Dallas, Tex. 75230; George W. Tate, Jr., 121 C Artillery Post Dr., Houston, Tex. 78234

[22] Filed: Dec. 4, 1972

[21] Appl. No.: 311,533

Related U.S. Application Data

[62] Division of Ser. No. 54,289, July 13, 1970, Pat. No. 3,705,003.

[52] U.S. Cl. ................................................. 351/23
[51] Int. Cl. ............................................... A61b 3/02
[58] Field of Search ............... 351/1, 17, 23, 24, 32, 351/36, 37, 39; 128/2 T

[56] References Cited
UNITED STATES PATENTS

| | | |
|---|---|---|
| 3,172,404 | 3/1965 | Copenhaver et al ............. 351/24 X |
| 3,317,268 | 5/1967 | Oswold ............................. 351/23 X |
| 3,421,498 | 1/1969 | Gans ................................. 351/24 X |
| 3,450,466 | 6/1969 | Streisinger ....................... 351/39 X |
| 3,572,912 | 3/1971 | Knoll ..................................... 351/36 |
| 3,664,732 | 5/1972 | Lynn ................................. 351/23 X |

*Primary Examiner*—Paul A. Sacher

[57] ABSTRACT

An illustrative embodiment of the present invention includes apparatus for determining the threshold value of visual stimuli presented at selected locations in the visual field of a subject. Programmed automatic data processing equipment is utilized in a unique two way feedback system with an external apparatus to present the stimuli in an unpredictable fashion and a subject response device. The subject communicates with the data processing equipment via the subject response device and the system interprets the responses to dynamically alter the stimulus presentation regime while communicating a feedback to the subject of correct or incorrect perception of a given stimulus.

13 Claims, 13 Drawing Figures

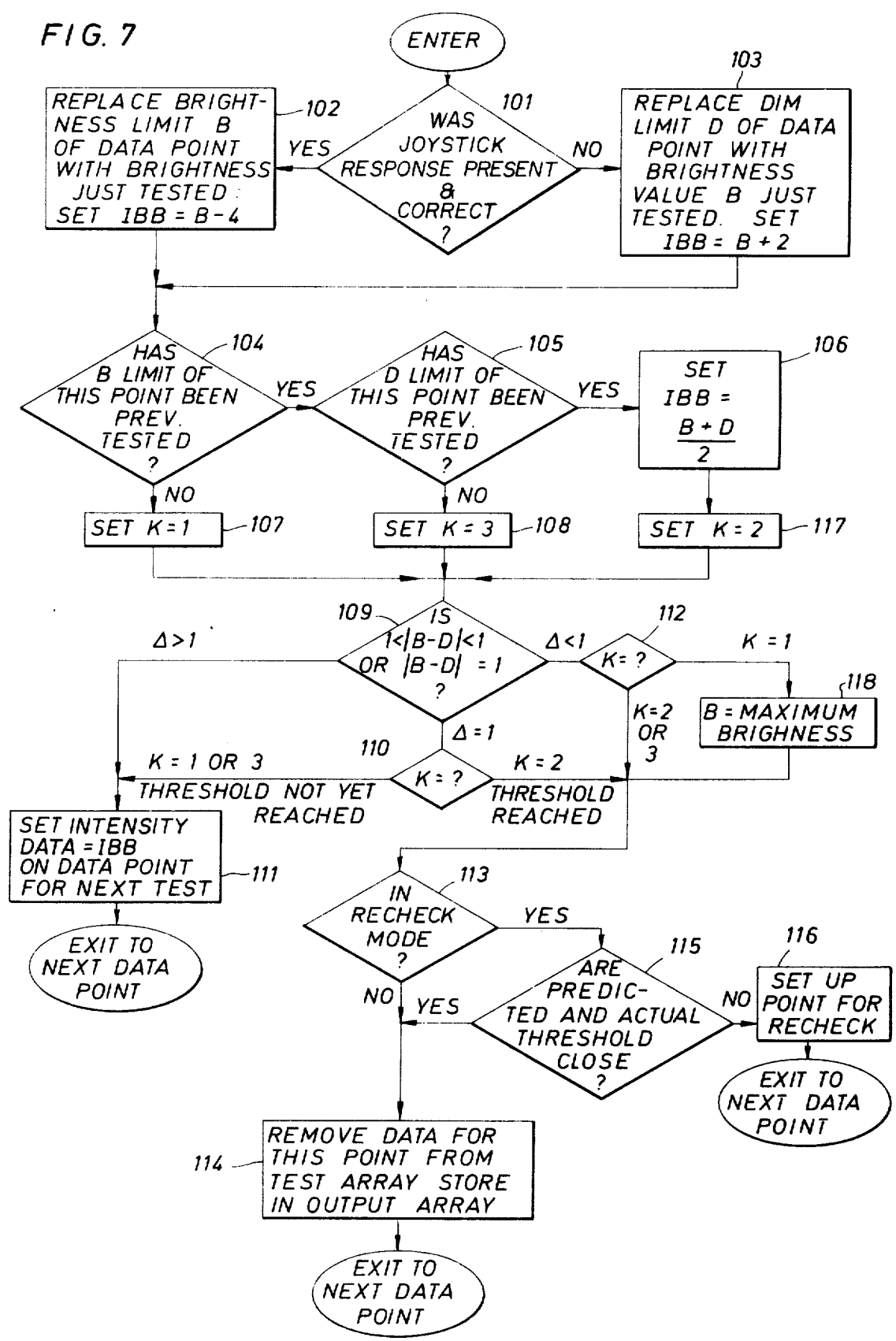

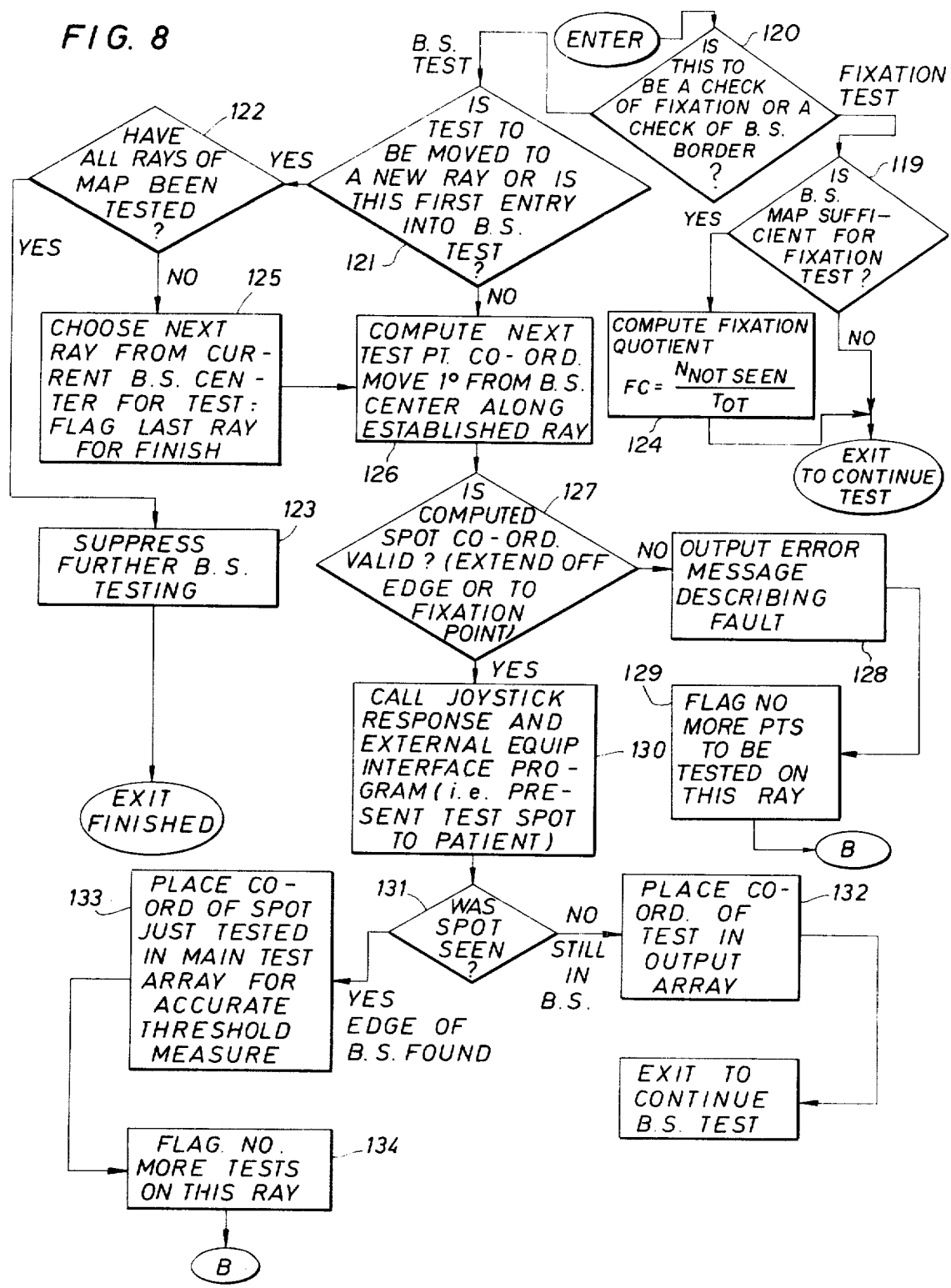

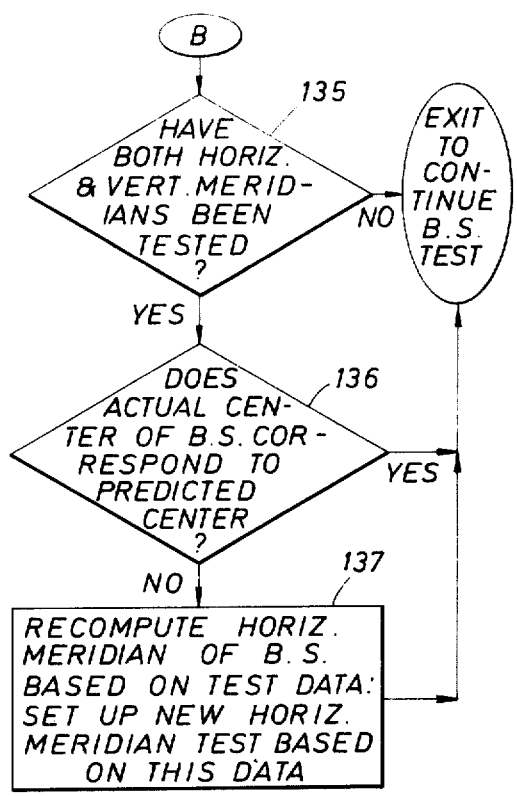
FIG. 8A
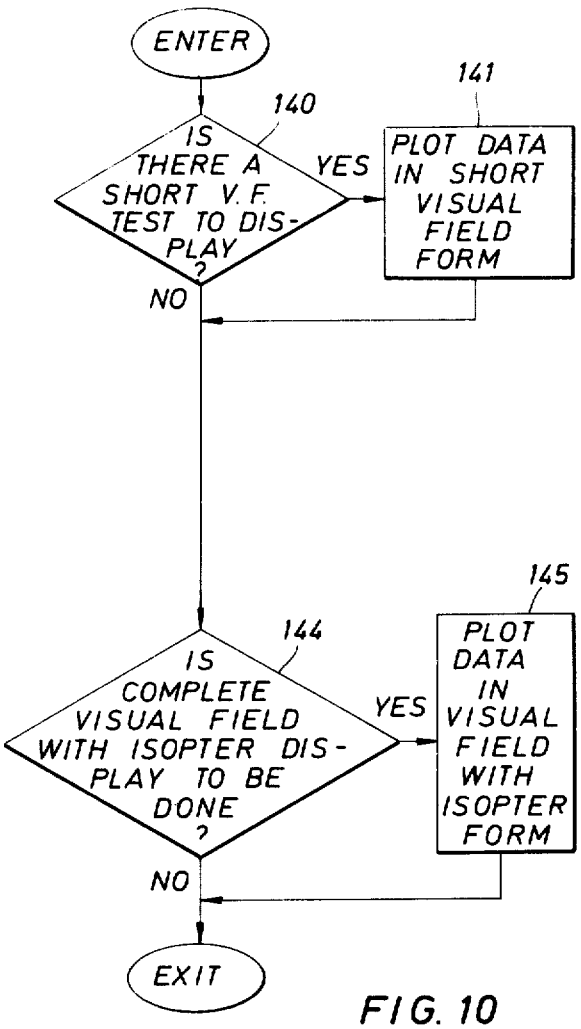
FIG. 10
FIG. 9
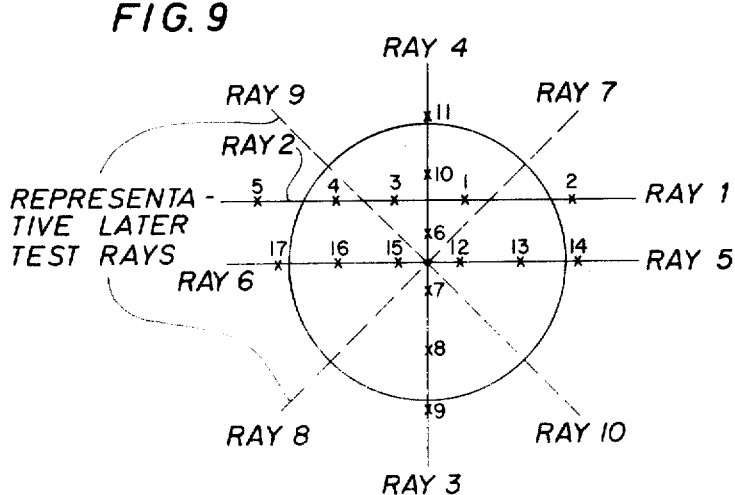

ated methods and apparatus for examining the visual field of a human patient utilizing the principles of static campimetry.
COMPUTER CONTROLLED APPARATUS FOR AUTOMATIC VISUAL FIELD EXAMINATION The invention described herein was made in the course of work under a grant or award from the Department of Health, Education and Welfare.

Reference To Copending Applications

This application is a division of application Ser. No. 054,289, filed July 13, 1970, now U.S. Pat. No. 3,705,003.

BACKGROUND OF THE INVENTION

This invention relates to examination of the field of vision of a human patient and more particularly to automatically implemented methods and apparatus for examining the visual field of a human patient utilizing the principles of static campimetry.

The visual field of a subject or patient may be defined as the family of solid angles in which the patient may observe a given set of graded stimuli while his gaze is fixed at a point in space. Each solid angle or cone shaped section of space contained in this family is a function of the stimulus value as determined by the size, brightness and direction of the stimulus, as well as the condition of the subjects visual system. In a normal person a maximum stimulus may be seen over a lateral expanse of roughly 216° using both eyes, or 170° using a single eye. The methods of the present invention are concerned with measuring the visual field of a single eye.

Visual fields are important in the detection and diagnosis of diseases which affect the brain and the visual system. For this reason visual fields are important to ophthalmologists, neurosurgeons or other specialists who deal with these diseases. Visual fields also are of interest and use to the general practitioner in the management of diseases such as diabetes. In fact, all seven of the major causes of organic blindness in the United States (Glaucoma, Cataract, Diabetes, other vascular diseases, Uveitis, Retinal detachment and Senile macular degradation) have characteristic patterns of defect in the visual field. Measurements of the visual field of a patient which are highly reproduceable from time to time in an objective manner are very valuable in detecting the progression of the above diseases and may in fact be useful in determining the location of other physical defects such as pituitary tumors.

Visual fields have, in the past, been displayed by the use of isopter lines or lines of constant visual sensitivity which are drawn from the results of a manually conducted test. Manual testing which has been conducted in the prior art has usually been of two types, the kinetic and static type. In the kinetic method, spots or stimuli of a known size and brightness are moved inwardly from beyond the edge of the peripheral vision of the patient until the subject signals in some manner to the examiner that he sees them. This method, while relatively fast, introduces a source of inaccuracy because of the reaction time lag between the subject's seeing the stimulus and his signal to the examiner. Kinetic visual field testing can also fail to detect relatively small blind areas within the visual field.

The static method of manual visual field testing has utilized stationary stimuli displayed at fixed points in the visual field. Starting and remaining at such a point, and initially utilizing an imperceptible stimulus value, the size and/or brightness of the stimuli are increasing in steps with intervening pauses until the subject signals the perception of the most recent brightest stimulus. This establishes a threshold value at the test point selected, and the procedure is extended to a number of other selected locations in the visual field where the process again determines the stimulus which may just be seen. This method generally produces more accurate results than the kinetic method but has the disadvantage of requiring a relatively long time to conduct a complete test. Moreover, the repetitive presentation of static stimuli in the same location without adequate intervening pauses or, worse yet, the gradual brightening of a continuously presented stimulus will cause local bleaching of the retina in the retinal area where the test spot is focused. This process, called local adaptation, may be avoided by delaying tests at the same retinal location until the eye has had time to recover from the previous test. A sequential display of stimuli at different fixed visual field locations eliminates this error source.

Due to the relatively long manual static test the patient may lose interest or shift his gaze from the point of fixation. This reorients the visual field and leads to spurious test results. The present invention tends to avoid this difficulty by speeding up the test, presenting the stimuli in a relatively random sequence and maintaining the patient's interest through the use of a two-way feedback system. The novel test system of the present invention feeds back information to the subject indicating a correct or incorrect response to a given stimulus while at the same time dynamically altering the presentation of stimuli to the subject in response to his reaction to previous stimuli.

With the present invention, inadvertent suggestion by the examiner is avoided through the random presentation of test stimuli at various locations in the visual field of a subject. This contributes markedly to the objectivity and reproducibility of the testing procedure. The random and unpredictable presentation of test points in the visual field reduces the anxiety of the patient and maintains his interest. Time consuming rest periods which are necessary to counteract the "bleaching" or local adaptation of the retina to stimuli are also avoided.

Accordingly, it is an object of the present invention to provide a method of examining the visual field of a subject which is implemented by automatic data processing equipment in combination with stimuli producing apparatus and a unique patient response device.

Another object of the present invention is to provide a method for determining the visual field of a patient which maintains the interest of the patient by providing a two-way feedback system wherein the patient's responses dynamically alter the testing procedure while simultaneously informing the patient as to the correctness of such responses.

Another object of the present invention is to provide an automatic method and apparatus for determining the visual field of a subject which is faster and more objective than methods known in the prior art.

A still further object of the present invention is to provide method and apparatus for determining the visual field of a patient and recording the visual field in a form useful to the medical profession.

In accordance with the objects of the present invention method and apparatus are provided for determining and recording the visual field of a subject. The method, which is implemented by programmable automatic data processing equipment utilized in conjunction with peripheral testing equipment, is capable of producing accurate and reproducible results. A computer program is utilized to control the position, size and intensity of test stimuli which are presented at predetermined locations in the visual field of the subject by appropriate peripheral equipment. The program determines the threshold level of stimulus which the subject may detect at a given point in his visual field by presenting such stimuli of computed intensity to the subject in a random and unpredictable manner against a background field of constant intensity.

The subject responds to the stimuli presented in the test field by indicating the position at which a stimulus was seen. A manual response device which may be referred to as a joystick and which has 2° of freedom is used to indicate the angular sector of the visual field in which the subject observed the stimulus. If the subject's response was correct within acceptable limits the system provides him with a reward in the form of a pleasant audible signal indicating that his response was accurate. An audible signal having a different and more unpleasant tone is used to indicate an inaccurate response. Simultaneously, the computer uses the subject's response to a given stimulus to control the size and intensity of subsequent stimuli presented at the same geometrical location in his visual field. This is done in such a manner that the threshold level of the subject at a given geometrical location is determined in an efficient manner and with an alacrity not previously possible using manual tests.

In this manner visual field tests are conducted at any suitable number of points in a subject's visual field to allow an accurate determination of the shape of the visual field. When all such test points in the visual field have been examined, the system records or displays the output data in a form convenient for the use of the medical profession. Such output may comprise, for example, visual field maps having isopter or constant threshold level lines.

The novel features of the present invention are set forth with particularity in the appended claims. The present invention, both as to its organization and manner of operation, together with further objects and advantages thereof may best be understood by way of illustration and example, when taken in conjunction with the accompaning drawings, in which:

BRIEF DESCRIPTION OF THE DRAWINGS

FIG. 7 is a logic flow diagram for a computer subprogram for modifying the stimulus value in response to the input from the patient;

FIGS. 8 and 8A are logic flow diagrams for a computer subprogram to provide a detailed map of the normal blind spot in the visual field of a patient;

FIG. 9 is a schematic diagram illustrating the shape of a normal blind spot in the visual field of a subject together with the location and order of stimulus points generated by the program and used to determine the shape of this blind spot;

FIG. 10 is a logic flow diagram for a computer subprogram for data output in the present invention;

DESCRIPTION OF THE PREFERRED EMBODIMENT

Figure 2:
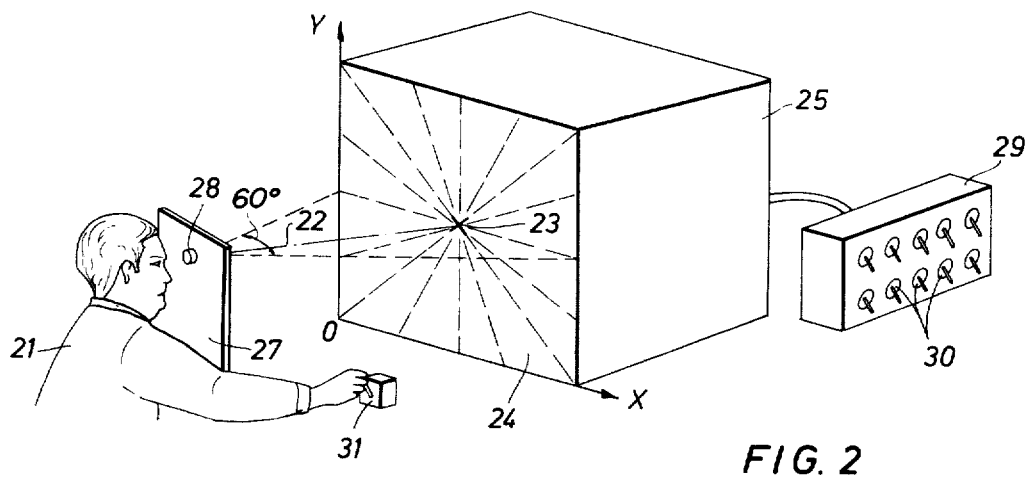
FIG. 2 is a schematic three dimensional view showing an exemplary test set up of the present invention including the position of the subject.

The field of vision of the human eye is that part of space in which stimuli are visible during the steady fixation of gaze in a particular direction. Referring initially to FIG. 2 of the drawings, the gaze of a subject 21 is fixed along a visual axis 22 in the direction of a fixation point 23 which is situated in the center of the screen 24 of cathode ray tube 25. The visual axis 22 is defined as a line joining the pupil of the eye and the point of fixation 23. A mask member 27 having an aperture 28 therein and which preferably defines a head support (not shown) for positioning the patient's head a desired distance from the face of the screen 24 and relative to the aperture 28. If the visual axis is as indicated, then the face of the cathode ray tube device 25 covers a portion of the visual field of the subject 21 subtending a horizontal angle of approximately 60° as illustrated. The mask member 27 and aperture 28 are utilized to permit only one of the subject's eyes at a time to view the face of the cathode ray tube device 25.

A coordinate system having x and y axes as indicated in FIG. 2 with the origin located at the lower left hand corner of the screen may be utilized to define locations in the visual field of the subject 21 by assigning two coordinate numbers x and y to any point on the face 24 of the cathode ray tube device 25. Thus locations in the visual field of the patient may be quantized in a manner convenient for handling by automatic data processing equipment which is connected and programmed in a manner to conduct the test of the subject's visual field as will be hereafter described. To the right of the computer driven cathode ray tube device 25 in FIG. 2 is a control panel 29 which is illustrated schematically. Control panel 29 has a plurality of toggle switches 30, or the like, which may be used by the examiner to indicate conditions of the test or to input data to the automatic data processing equipment. A manual response 31 is situated between the masking apparatus 27 and the face 24 of the cathode ray tube 25 within convenient reach of the subject 21. During the course of the visual field examination the subject 21 communicates with the automatic data processing system by the use of this manual response device. Details of the operation of the manual response device 31 will be discussed subsequently. While not shown in the drawing of FIG. 2, it will be understood by those skilled in the art that any desired corrective refractive lenses may be placed near the aperture 28 in the masking apparatus 27 and between the eye of of the subject 21 and the face of the cathode ray tube 25 to correct for any refractive defects which the subject 21 may possess.

One type of examination to measure the extent to which the normal eye can detect the presence of objects which are off the visual axis may be referred to as perimetry. Large or relatively bright test objects may generally be seen at locations having coordinates quite eccentric from the fixation point. On the other hand, small objects or those with low contrast in comparison with the background usually cannot be seen until their angular distance or eccentricity from the visual axis is relatively small. In an examination by perimetry, the distance from the test stimuli to the eye is maintained constant (i.e., test stimuli are presented on the surface of a sphere centered at the eye). Campimetry is a method similar to perimetry for measuring the visual field in which test stimuli appear at distances from the patient's eye proportional to the minimal eye — screen distance by the secant of the angle of eccentricity. That is to say, a testing apparatus such as shown in FIG. 2 is a campimetry device since the surface upon which the test stimuli are displayed is a plane surface, and hence, objects near the edges of the display screen 24 are a short distance further from the eye of the subject 21 than stimuli presented near the center of the screen. This, of course, slightly affects the size of the stimuli as they appear to the test subject. Both perimetry and campimetry are valid tests and may be used equally well to examine the visual field of a subject. It is, however, difficult to compare results of these different types of tests quantitatively. The present invention utilizes the principles of static perimetry or campimetry in which stationary stimuli are presented at various selected locations in the visual field of the subject. The stimulation value or size and brightness of these stimuli may be varied and as previously discussed, the order in which they are presented to the subject is preferably varied in an unpredictable manner.

The threshold value of a point in the visual field of a subject may be defined as the degree of stimulation just required for perceptual response in the test area. For a test stimulus to qualify as the threshold of static perception, the response to a given stimulus value must be coupled with the failure to respond to a second stimulus whose value is one quantized step dimmer than the intensity of the stimulus which was seen. A form of recording the visual field which is useful is a record of the numerical threshold values at selected points in the visual field.

In the present invention an automatic data processor or digital computer completes a two way feedback loop between the test subject and the test regime or routine. In this two way feedback system the test regime itself may be updated based on the response of the subject. By use of an audible subject response indicator, the subject is provided with an indication of success or failure in responding to the stimuli presented. A pleasant tone is presented to the subject for a correct response while an unpleasant tone indicates an incorrect response. This feature helps to sustain motivation of the test subject, as well as increase the precision of his response. Motivation is an important psychological factor in visual field testing as some less motivated subjects have difficulty in fixating their gaze adequately and responding promptly and consistently for a good visual field test.

In any type of perimetry or campimentry the degree of fixation or the ability of the patient to maintain h gaze at a fixed point is very important in performing valid examination. The present invention may be utilized to provide an objective and quantitative test of th degree of fixation. A fixation coefficient which gives quantitative measure of the degree of fixation whic the subject was able to maintain throughout the te; may be computed from the test data. This enables mor accurate interpretation of the results of the visual fiel test than would otherwise be possible.

Figure 1:
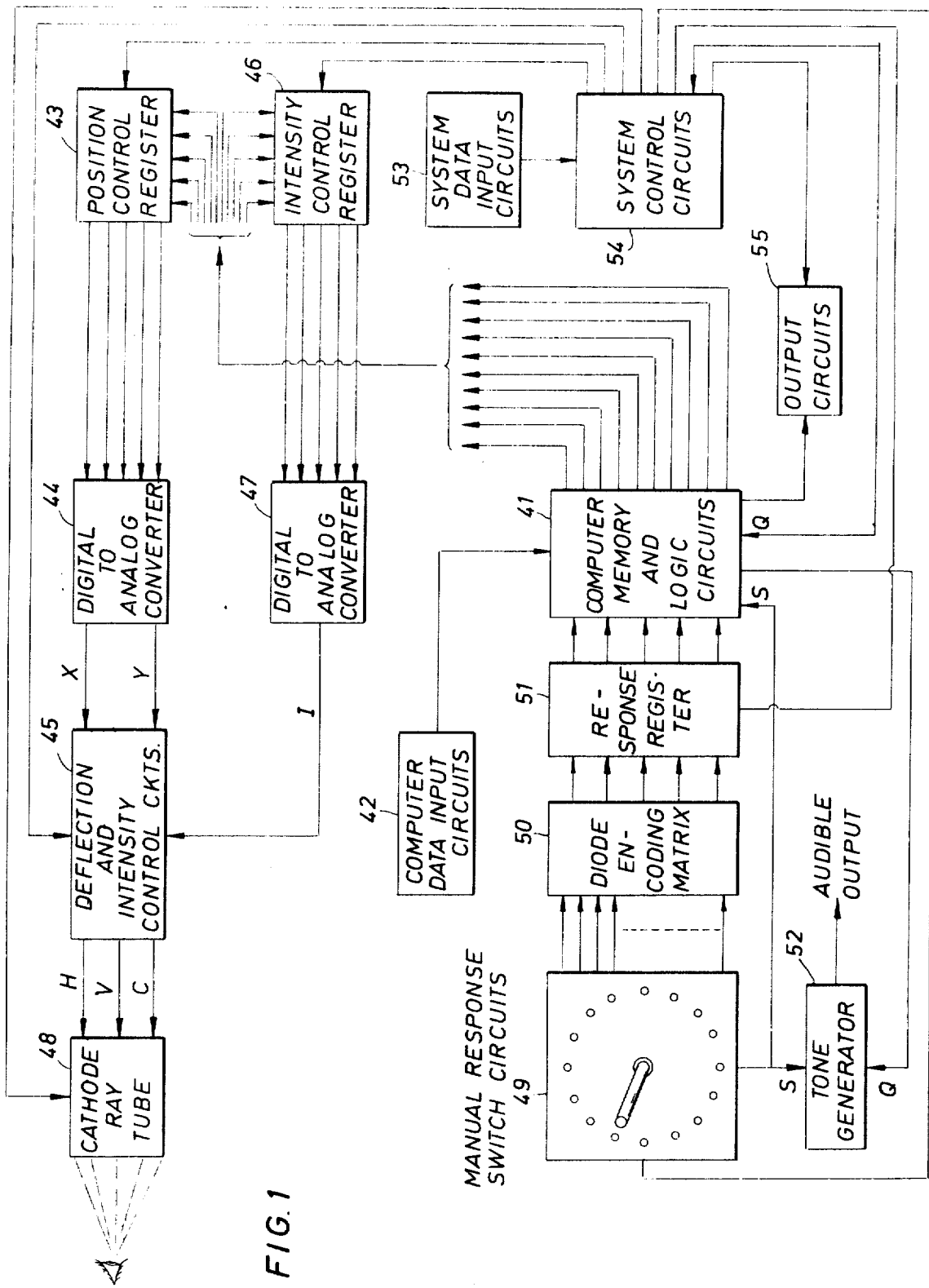
FIG. 1 is a block diagram showing an overall view of apparatus of the testing system of the present invention.

Referring now to FIG. 1, the overall system of th present invention is shown in block diagram form. Th backbone of the system is an automatic data processc or general purpose digital computer 41. The compute 41 may be any of a suitable variety of small general pu pose machines such as an IBM 1130 series compute Alternatively, the system of the present invention coul be used in time sharing mode on a large scale compute system if desired. In this mode a plurality of systems c external hardware such as shown in FIG. 1 could be lc cated remotely, say in doctors' offices, and processe in parallel by a single large computer. In any case th computer 41 communicates to the external world an to the subject patient via a plurality of external device: For example, the computer data input circuits 42 ma comprise any of a variety of input devices such as tape reader, card reader or typewriter, etc. Outputs c commands in the form of digital numbers from the ger eral purpose digital computer 41 are supplied on a plu rality of data lines to the external testing equipmen For example, the x-y coordinates of a test spot at whic a stimulus is to be generated are provided from com puter 41 to a position control register 43 in the extern; equipment. The contents of position control register 4 are converted to analog form by digital to analog cor verter 44 and are supplied as a pair of analog signals t appropriate deflection control circuit electronics 4! The operation of such analog position control circuitr may be similar to that of a conventional television se as known in the art or that used in digitally controlle conventional CRTs.

The intensity control register 46 receives digital out puts from computer 41 and its contents are converte to analog form by a second digital to analog converte 47 which presents the intensity control signal in analo form to the intensity control circuits 45. Deflection an intensity control circuit unit 45 utilizes the three analo input signals to provide a spot or test stimulus at the re quested coordinates and with the requested intensit on the face of the cathode ray tube 48. The apparatu thus provides test stimuli to the subject under prograr control of the computer 41.

The subject completes the testing loop by respondin manually via the manual response switch circuit 4S This manual response circuit is also referred to herei as the "joystick". Operation of the manual response de vice does two things. First, the sector or angular arc i which the joystick contact is completed is encoded i digital form by a diode encoding matrix 50 and supple to a digital response register 51. The digital respons register 51 in turn, may be sampled selectively by th computer 41 under program control. Secondly, opera tion of the joystick 49 acts to start tone generator 5 to produce an output. As will be described subsequently, the pitch of this audible output is variable under program control. This tone is indicative to the subject as to whether his response to the test stimulus was correct or incorrect, i.e.; sufficiently precise in direction.

Conditions of the testing may be controlled by the system operator through the use of the switches 30 of panel 29 of FIG. 2. These switches correspond to the block 53 labeled "system data input circuits" in the drawing of FIG. 1. These switches may be used to control system parameters such as the duration of the test spot and the time between applications of test stimuli to the subject. Other system parameters such as whether to repeat test stimuli at positions having dubious results may also be controlled by positioning these switches appropriately. The switch positions are encoded as digital numbers by the system data input circuits 53. The system control circuits 54 are rendered responsive to the output of the data input circuits 53 and allow the computer 41 access to the status of the switch settings.

The system communicates with the operator and the outside world through the use of output circuits 55. The circuits may comprise any of a variety of computer output display or record devices such as a cathode ray tube, a graph plotter, a line printer, a typewriter, or other desired device capable of converting the computer output to a form usable in the external world. The system control circuits 54 are also in communication with computer output circuits 55 so that the status of the system may be monitored by the operator.

In operation the system of FIG. 1 is set in motion by the operator through the computer data input circuits 42 and the system data input circuits 53. These data input circuits are utilized together with the program control of the digital computer 41 to generate test stimuli on the face of the cathode ray tube 48 via position control register 43, intensity control register 46, their associated digital-to-analog converters 44 and 47 and the deflection and intensity control circuits 45. When a stimulus is presented the patient responds by indicating the angular sector of the screen (denoted by the dotted line wedges of FIG. 2 where) the stimulus was observed in via the manual response device 49. The subject's response is rendered in form useable to the computer 41 via the diode encoding matrix 50 and response register 51. A suitable response feedback (correct or incorrect) is supplied to the patient via the tone generator 52. The response of the subject is then dynamically used in the program to alter the testing process. When the testing is complete, as determined by the program, output circuits 55 under program control sample the status of the system controlled circuits 54 and the visual field data generated by the test and render these data to a form useable by the examiner. Thus the system of the present invention provides a two way feedback to the test subject by dynamically varying the testing process while conducting a visual field examination utilizing the principles of static campimetry under the real time control of the digital computer 41.

Figure 3:
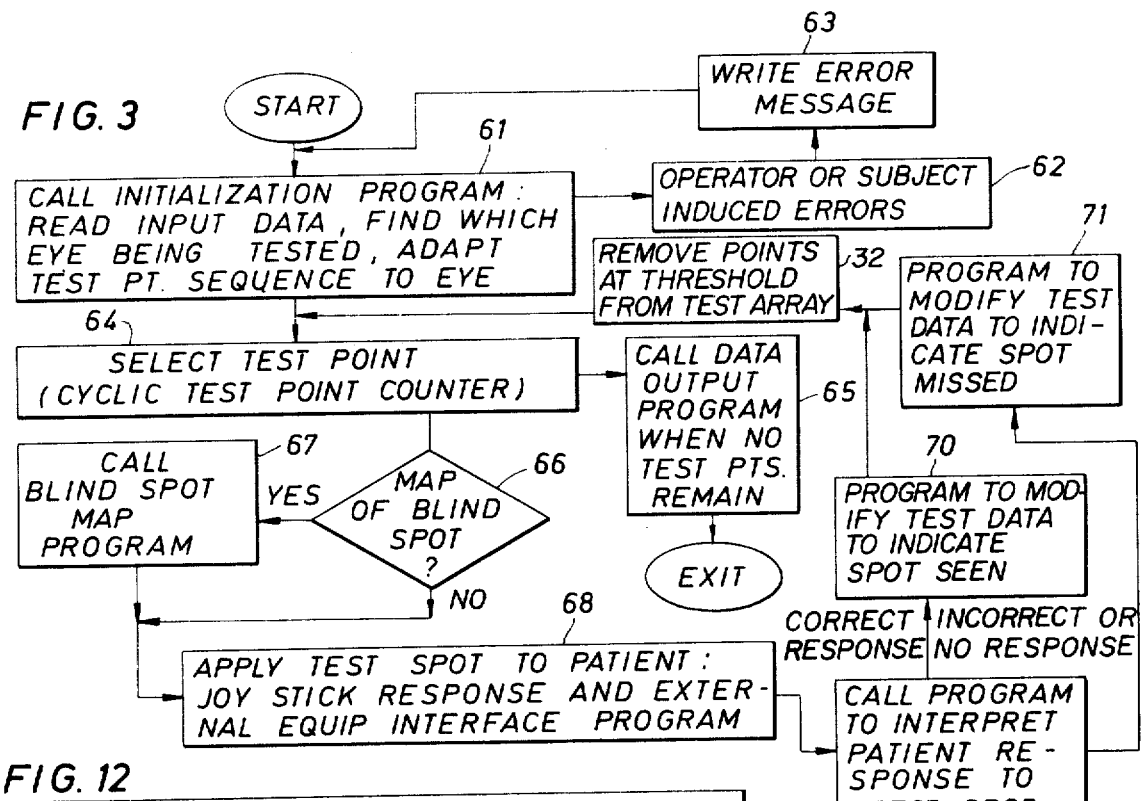
FIG. 3 is a computer program flow chart showing overall computer logic flow for implementing the method of the present invention.

Referring now to FIG. 3, the overall method of the present invention as implemented by the real time computer program of digital computer 41 is illustrated in a macro flow chart. Details of this overall method will be discussed subsequently with respect to the other flow charting figures. Generally, the examination is started by the operator when the input test data is supplied, for example in card form, to a card reader comprising a portion of the computer data input circuits 42 of FIG. 1. The system input circuits 53 of FIG. 1 having been previously set to the desired conditions for the test, the computer 41 is placed in operation and performs the visual field examination under control of the program. The first step in the program as indicated in block 61 of FIG. 3, is to call an initialization subprogram which reads the input data, discovers which eye is being tested and adapts the input test point sequence to the particular eye. At this point it is possible as indicated in block 62 to discover operator and/or subject induced errors. In this case an error message is written as indicated at box 63 and the program awaits correction of the error then loops back to block 61.

Assuming that the input data has been adapted to the eye being tested, a test point is selected from the test point array and presented to the subject as indicated at block 64. Test points are repetitively presented from the input data area until all test point thresholds have been determined. When all test point thresholds have been determined a data output program is called as indicated at block 65 and the test is complete. A program option which may be controlled, for example, by the switches 30 discussed previously is a map of the patient's normal blind spot. Each normal eye has a generally elliptically shaped blind spot. The right eye blind spot is to the right of the fixation point and the left eye blind spot is to the left of the fixation point. If, as decided at block 66 the blind spot is being mapped, at block 67, a subprogram is called which performs a test on a single point in the blind spot area. Subsequent points in the blind spot area are randomly intermingled with points in the preselected test array to reduce patient anxiety and promote good fixation. Assuming that the blind spot map is finished or that this option is not desired, the decision at Block 66 is no and a stimulus from the visual field test array is then applied to the patient by calling a subprogram as indicated at block 68. This subprogram (to be discussed in more detail subsequently) applies the test point data via the previously discussed external equipment to the subject and registers his response.

Another subprogram which interprets the patient's response to the test stimuli is called as indicated at block 69. If the patient's response was affirmative or is interpreted to be correct, the data is modified to indicate the spot was seen, as indicated at block 70. If the subject's response was incorrect or if he did not respond, then the program performs the appropriate modification of the test point data to indicate the spot was missed as indicated at block 71. In either event the program continues to block 32 where it is determined if a threshold has been reached. If so, this data point is removed from the test array and placed in an output buffer for later display. The program then loops back to continue the testing sequency by selecting a new test point. Finally, as stated previously, when all test points have been exhausted the visual field examination is complete. At this point the resultant visual field data output is provided to the examiner in a desired format.

Figure 5:
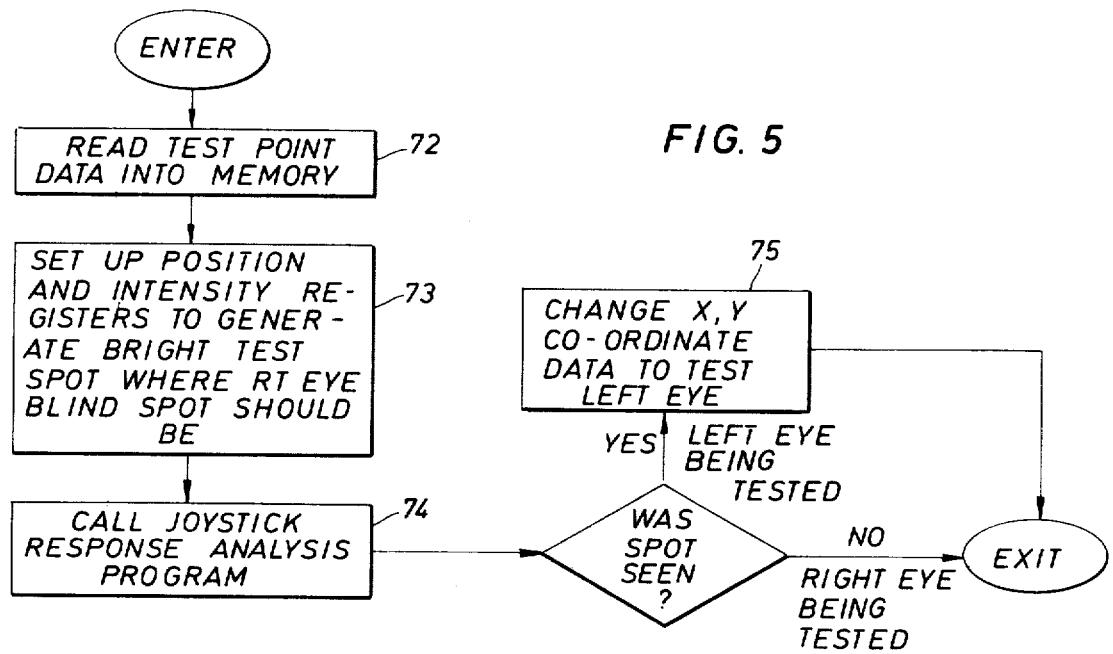
FIG. 5 is a logic flow diagram showing a computer subprogram for initializing a visual field examination.
Figure 4:
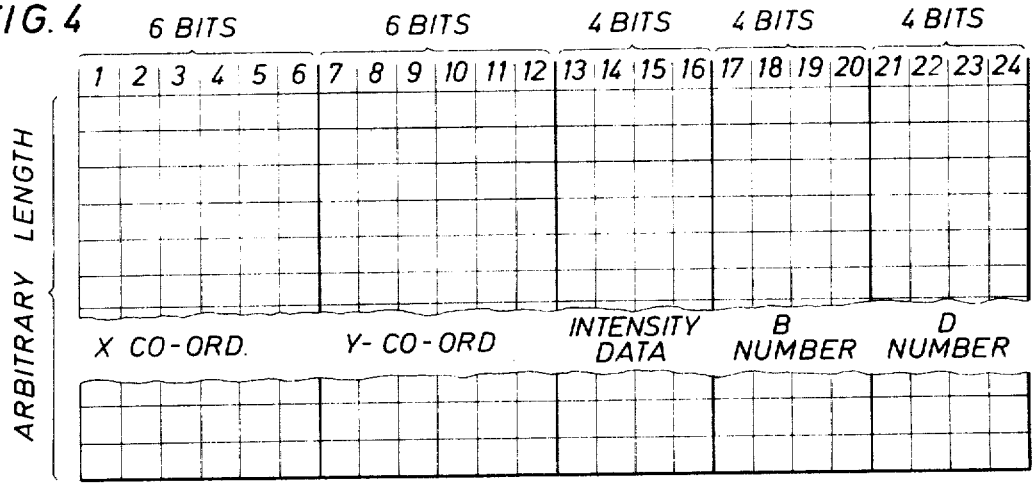
FIG. 4 is a schematic diagram showing the manner in which the test point data can be stored in the computer memory while conducting a visual field test.

Referring now to FIGS. 4 and 5, the functioning of the initialization subprogram called in block 61 of FIG. 3 is described in more detail. As previously stated, an array of test points is entered to the system by the operator by placing input data into the computer data input circuits 42 of FIG. 1. This input data comprises a plurality of unpredictably distributed test points and predicted threshold brightness values for each point. As many points as desired may be used, however it has been found that about 200 test points can provide as detailed a visual field map with isopter lines as is normally desired. For other purposes, such as a quick driver's license screening test, as few as 10 or 15 test points will suffice. In any case, input of test point data is the first step in conducting the visual field test.

The test point data may be in the format shown in FIG. 4, if desired. In FIG. 4, the data for each test point is compressed into segments of 24 bit length. In the example of FIG. 4 the first six bits on the left end of the computer words of the test point array comprise the $x$ coordinate on the face of the cathode ray tube of the test point. The second six bits of the word provide the $y$ coordinate. This implies that the face of the test screen or cathode ray tube is divided into a 64 × 64 grid upon which test points may be presented. It will be appreciated by those skilled in the art, of course, that, if desired, a computer having a word length of 24 bits could be utilized, or if the word length of the computer is less than 24 bits, such as 16, the data can be spread over two or more words. Also, the number of binary digits or bits for each datum input could be changed. For example, a 256 × 256 grid could be provided for by using 8 bits for the $x$-$y$ coordinate data. This would provide greater registry precision for the test point data than the 6 bit data allows. It has, however, been found through experience that a 64 × 64 array is suitable for performing the static campimetry method of the present invention.

Returning to the example of FIG. 4, the remaining 8 bits of each 24 bit computer word are occupied by two 4 bit numbers, the $b$ number and the $d$ number whose use will be described subsequently. It will suffice to say at this time the $b$ number represents the highest stimulus value which can be tested or which has been tested, and the $d$ number represents the lowest stimulus value which can be tested or which has been tested. The intensity data, which is also 4 bits in length, is initially set to a predicted threshold stimulus value and is supplied via intensity control register 46 and its associated digital-to-analog converter 47 to the intensity control circuits 45. It is thus possible to obtain any of 16 predetermined intensity settings from the 4 bit number.

When the test point array appears in memory, the initialization program shown in flow chart form in FIG. 5 selects a test point which is predicted to be in the normal blind spot area of the right eye as indicated at block 73 of FIG. 5. By applying a test point of a predetermined maximum brightness level in the area where the right eye blind spot should be, it is possible for the program to determine which eye is being tested. To this end, as indicated at block 74, a subprogram, which will be subsequently described, is called to perform the function of interfacing the computer 41 with the external equipment for the presentation of a test point. The interface program passes an indicator which indicates whether the patient responded to the stimulus presented. If the subject did respond to the stimulus it is necessary to modify the input data slightly, as indicated at block 75 of FIG. 5. If the subject did not respond to the stimulus the program presumes that the right eye is being tested as the test spot is generaged in the position where the right eye blind spot should be. By providing an additional test point in the area where the blind spot of the left eye should be, operator error or presence of a damaged eye can be determined.

The input data modification is required since the format of the original input data is chosen to be for the right eye and a typical test pattern is usually chosen to omit testing in area of the blind spot. In accordance with the preferred embodiment of the invention, a subprogram is called for testing the normal blind spot. Thus a coordinate transformation amounting to a reflection about the vertical axis through the fixation point, is necessary to change the input data to a form suitable for mapping the visual field of the left eye. When this is done, the subprogram exits. The main program's next action is, as indicated at block 64 of FIG. 3, to select a test point for presentation to the subject.

Figure 6:
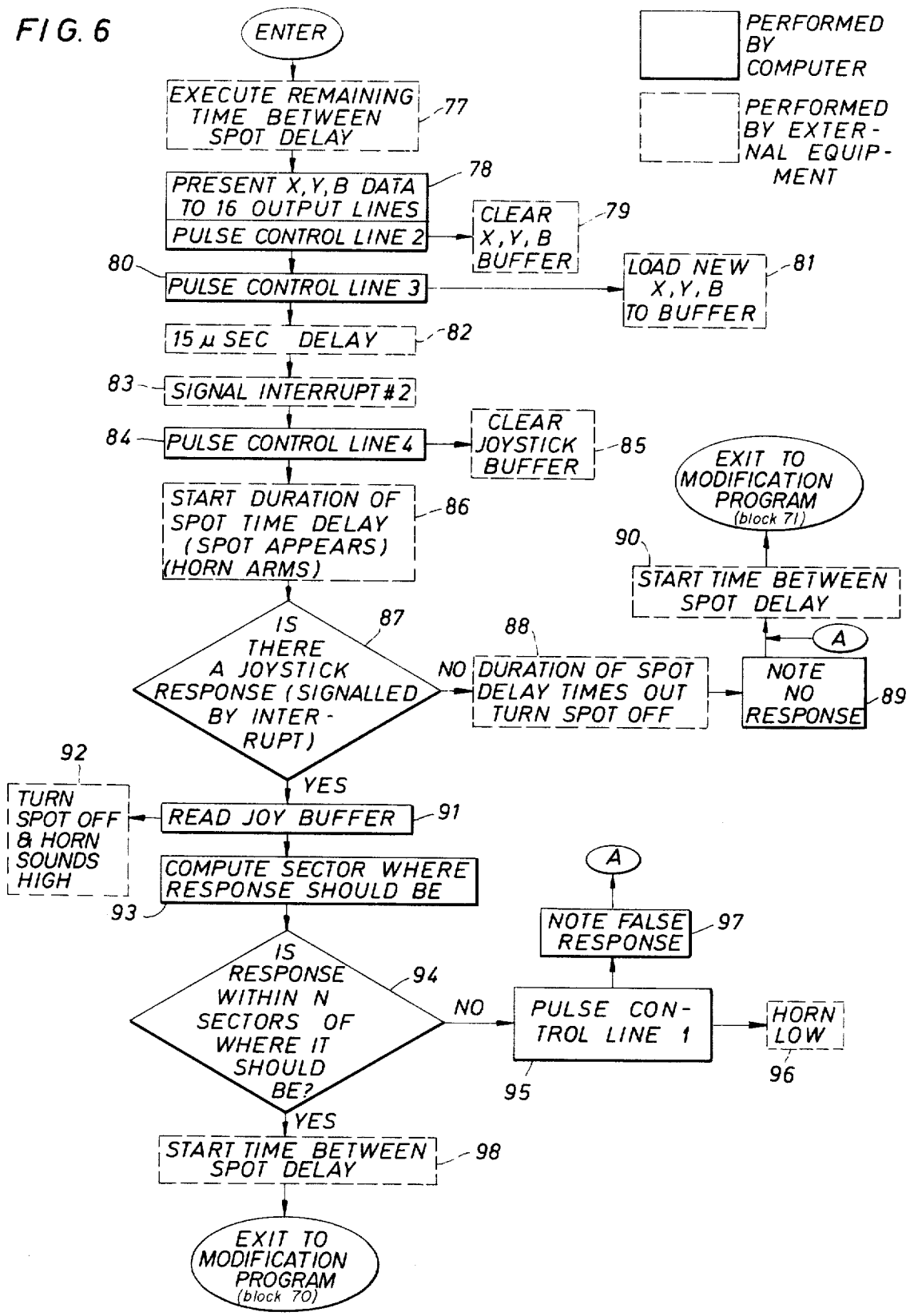
FIG. 6 is a logic flow diagram for a computer subprogram which performs the function of interfacing the stimulus presentation apparatus and the patient response apparatus of the present invention with the automatic data processing system.

Referring now to FIG. 6, the flow chart of the interface subprogram for presenting a test point to the subject is shown. It will be understood that the external equipment-computer interface can vary as the computer model or external equipment is changed. The particular sequence described here is presented as being illustrative of a particular interface between an IBM 1131 B computer and external equipment constructed for use therewith. The invention, however is not limited to this configuration. In this flowchart some steps are executed by the programmed computer 41 of FIG. 1 and some steps are executed by the external circuitry such as the system control circuits 54 of FIG. 1. The steps indicated in solid boxes are performed by the computer 41 and those indicated by dotted boxes are performed by the external equipment. When the program is entered, it should be noted, as indicated at block 77, that the external equipment requires that any remaining time in the delay between stimuli present by completed before the next stimulus can be presented to the subject at a new test point. The coordinate data for the 6 bit $x$-$y$ coordinates and the 4 bit intensity data (i.e. stimulus strength) are presented to the external equipment as indicated at block 78 by presenting this data to 16 output lines and four central lines which are connected to the external equipment. Buffer registers on the external equipment are prepared to accept this data by pulsing control line 2 which also communicates with the external equipment. This clears the input buffers to the external equipment as indicated at block 79. The computer then pulses control line 3 which loads the new data from the output lines into the buffers contained on the external equipment. These steps are performed as indicated at blocks 80 and 81 of FIG. 6.

Upon receipt of this data the external equipment initiates a 15 microsecond delay and then signals its receipt by an interrupt to the computer as indicated at blocks 82 and 83. When the program receives the interrupt signal a pulse is applied to control line 4. This clears the joystick or external response media input buffer in the external hardware as indicated at blocks 84 and 85. This conditions the external equipment to provide a digitized response to the movement of the joystick when the subject signals that he has observed a spot or test stimulus. The pulse on control line 4 as indicated in block 84 also causes the external hardware to start a "duration of spot" time delay and to cause the spot to appear at the desired $x$-$y$ coordinate and with the desired intensity on the CRT screen as indicated at block 86.

The control line 4 pulse also arms the audible horn so that upon the subject's response by joystick deflection, a relatively high pitched sound indicates that the subject has responded correctly to the stimulus presented him. It will, of course, be understood that at the speeds at which the digital computer and external circuitry performs these instructions, the subject is quite likely never to hear this horn sound indicating a successful observation if, a few milliseconds later, the program determines that his response has been inadequate or incorrect and modifies the sound of the horn accordingly.

In any event the subject will either respond to the test stimulus if he sees it in some manner which may or may not be correct or acceptable or he will not respond if he does not observe the test stimulus. As indicated by the test block 87 of FIG. 6, if the subject does not respond before the "duration of spot" time delay runs its course then the external equipment automatically times out the spot and ceases to present this stimulus to the subject. This is indicated at block 88. A signal to the computer noting no response is provided at block 89 and the "time delay between spots" is started at block 90. It should be noted that the "time delay between spots" is variable and may be controlled by the operator through the use of the switches 30 of the input device 29 of FIG. 2.

If the subject responded to the stimulus by moving the joystick in the general direction of the portion of the switch circuit corresponding to the sector of the screen in which he observed the spot the response may or may not be correct depending upon the allowable error margin chosen for the test. This error margin may be determined by the switch setting of switches 30 of the input device 29 of FIG. 2. A subject response is usually not precise. Several adjacent sectors about the angular sector in which the stimulus is presented will be accepted as being a correct response. The diode encoding matrix 50 of FIG. 1 is utilized to encode the switch sector information provided by the subject. A grey code is used for this purpose. No two adjoining switch positions differ by more than one binary digit or bit from each other. This eliminates the possibility of a spurious response due to the simultaneous engagement of 2 switch contacts by the joystick. This assures a response accuracy of ±½ angular sector. A digital number representative of the sector in which the response was observed by the subject is thus entered into the response register 51.

The response register 51 is interrogated by the computer as indicated in block 91 of FIG. 6. Simultaneously the external hardware turns off the stimulus spot as indicated at block 92. Based on the known spot coordinates presented to the subject the program then computes at block 93, the angular sector where the subject's response should have been. If the response is not within the allowable number of error sectors of where it should have been (as indicated at block 94), control line 1 is pulsed (block 95) causing the pitch of the horn to change to a relatively lower sound indicating an incorrect response to the subject (block 96). This corresponds to the interpretive program of FIG. 3 (block 69). The false response is noted and the program starts the "time between spot delay" cycle to prevent premature display of the next test point to the subject as indicated at block 97.

If the response was within the allowable number of error sectors of where it should have been, then the "time between spots" delay is started immediately as indicated at block 98, and the program exits to call the modification programs, as indicated at blocks 70 and 71 of the overall flow chart of FIG. 3 to interpret the patient's response to the test stimulus.

Referring now to FIG. 7, the subprogram to modify the data points based upon the subject's response to the stimulus (blocks 70, 71 and 32 of FIG. 3) is illustrated in flow chart form. This program determines the next intensity of the test spot to be presented to the subject at the coordinates in question. Alternatively the program determines if the threshold level has been reached at this coordinate. If the threshold level has been reached, testing at the point in question is complete. An option which may be used if the threshold is too far removed from the predicted threshold is to re-test the threshold at the particular point.

It has been found through experimentation that if a given stimulus value was not seen that its intensity should be increased by 4 units for retesting. If a given stimulus value was seen its intensity is reduced by 2 units in the next test to determine the threshold. The steps just described are performed by the program as indicated at blocks 101, 102, and 103 of FIG. 7. The brightness limit $b$ and the dimness limit $d$ of a data point represent, at any given time, the supremum and the infinum of the set of stimulus values which have been tested at that point. The $b$ numbers are initially set to the highest stimulus level to be used in the test and are then reduced during the testing process in accordance with the subject's responses. The $d$ numbers are initially set at the lowest stimulus level to be used in the test and then increased during the testing process in accordance with the subject's responses. The number IBB referred to in blocks 102 and 103 of FIG. 7 is a predicted test value which will be used at the next test presentation at the coordinates if certain conditions as determined by the remainder of the program are satisfied.

In any event, the next step (as indicated at block 104) is to determine if the $b$ limit of the test coordinate has yet been tested. If it has been tested, then the program determines (block 105) if the dimness limit has been previously tested. If both have been previously tested, the predicted value of IBB is set to the half way point of the previously tested values (as indicated at block 106). This type of search may be termed a binary cut technique which may be shown mathematically to be very efficient. If the $b$ limit had not been tested (block 104) a flag $k$ is set equal to 1 to indicate this fact. If the dimness limit had not been previously tested the flag $k$ is set to a different value (3) to indicate this fact and if both extrema have been previously tested the flag $k$ is set to 2 indicating this fact. These steps are performed at blocks 107, 108 and 109 respectively.

Equipped with the information concerning the limit testing for brightness and dimness, the program logic can determine if the threshold has been reached. The absolute numerical difference between the brightness and dimness indicators $b$ and $d$ is either greater, equal to, or less than 1. This difference is an indication of whether the threshold has been reached. Such a test is performed at block 109 in FIG. 7 and corresponds to the entry to block 32 in FIG. 3. If the difference is greater than 1, it is apparent that the threshold has not yet been reached since the threshold is, as previously noted, defined as that value of brightness of the stimuli which when reduced by one step cannot be seen. On the other hand, if the *b* and *d* difference is exactly equal to 1 the threshold may or may not have been reached. It remains to be determined if the limits previously discussed have been tested in order to determine this fact. Such a test is performed at block 110 and if the brightness limit has not been previously tested or if both limits have not been previously tested as indicated by the value of the flag *k* then the threshold value has not yet been reached. Therefore, further testing for this point must be made to obtain the threshold. Using the newly computed brightness criteria (Intensity Date = IBB) (at block 111) the program exits to continue testing.

In the situation where the *b* − *d* difference is less than 1, a test is performed at block 112 of FIG. 7 *t* determine the value of the flag *k*. If the flag *k* is equal to either 2 or 3 then the threshold value has been reached. If the flag $k = 1$ it indicates that the brightness limit has not yet been tested and the brightness limit *b* is set to maximum +1 at block 118 to indicate that the maximum available brightness could not be seen. Thus the output scale of brightness values contains one extra number when compared to the scale of the test provided. In all three cases the threshold has been reached and a test is performed at block 113 to determine if the recheck option is called for. If no recheck is indicated then an immediate exit is made via block 114 in which the data for the test point is removed from the test array and stored in the output data array. If a recheck option is open a test is performed (at block 115) to determine if the recheck is necessary. This test compares the measured threshold with a predicted predetermined threshold based on the normal visual threshold. If this test fails, it is an indication that possibly some abnormality has taken place. Such a gross abnormality could indicate blinking or momentarily defocusing. The test point is set up for a recheck at block 116 by reinitializing the data concerning the brightness and dimness limits. If no recheck is indicated and the threshold has been determined, then the test point is removed from the test array (at block 114) and its threshold data stored in the output array. In any event the program has, at this point in time, modified the test point in response to the subject's response in a manner to arrive closer to the threshold determination.

Referring now to FIGS. 8 and 9, the logic flow for the blind spot mapping subprogram is shown. A normal blind spot is illustrated schematically in FIG. 9. The blind spot map is a program option which may be controlled by the switches comprising the system data input circuit 53 of FIG. 1. Before discussing the details of the logic of FIG. 8, a general statement of the manner in which the blind spot map is performed will be of assistance in following the program logic. It is assumed initially by the program that the geometrical center of the blind spot is known. Test points are then presented to the subject at approximately 1° arc increments along a ray (Ray 1) directed from the supposed center until the right edge of the blind spot is encountered. It will be noted that the order of test shown in FIG. 9 is the order of test used for mapping the blind spot border rather than the order of all tests presented to the subject, some of which can be used for testing the fixation quotient or mapping the visual field. The left edge of the blind spot is determined in a similar fashion by Ray 2. The perpendicular bisector of the line joining the two horizontal edges of the blind spot is then computed. Test points are presented at approximately 1° arc increments vertically downward along a ray 3 directed along this bisector until the bottom edge of the blind spot is encountered. Test points are then presented at approximately 1° arc intervals upwardly in a vertical direction along the ray 4 until the upper edge of the blind spot is encountered. Thus the upper and lower limits of a vertical chord through the blind spot are established. The perpendicualr bisector of this chord passes through the geometrical center of the blind spot and may be referred to as the computed horizontal meridian of the blind spot. Test points are presented at approximately 1° arc increments (Rays 5 and 6) along the horizontal meridian to establish the true horizontal extent of the blind spot. With the horizontal extent and horizontal meridian established the center of the blind spot has then been determined with accuracy. A plurality of rays are then defined from the center of the blind spot to its edges at varying angles such as that shown by the dotted lines (rays 7, 8, 9 and 10) labeled "representative later test ray." Test points may then be taken along these rays to determine the actual shape of the blind spot.

As many such rays may be used as desired to determine the blind spot shape. Generally 8 or 10 rays are sufficient to complete a map of the blind spot to the desired degree of precision. It should be noted that while mapping the blind spot an excellent measure of the degree of fixation of the subject may be computed by presenting fixation testing spots just inside the border of the blind spot and comparing the ratio of the total number of these points not seen within the blind spot to the total number of such fixation testing points presented in this area. If this coefficient approaches 1 the fixation of the patient may be stated to be excellent.

Referring now to FIG. 8, the logic flow of the blind spot mapping sub-program is shown in detail. Upon entry to the program a test is made (block 120) to determine whether test is to be a check of fixation or a test to determine the extent of the blind spot. If the blind spot extent is to be tested, a test is made at block 121 to determine if a new ray is to be tested or if this is the first entry into the program. If a new ray is to be tested or if this is the first entry into the subroutine, a second test is performed at block 122 to determine if all desired rays have been tested. If both these conditions are met then the blind spot map is finished. Further blind spot extent testing is suppressed by setting a flag (block 123), and the program exits.

If the blind spot test is still underway (as indicated by the test results of blocks 121 and 122) a new ray is chosen by the logic discussed above (block 125). A test point coordinate is computed at approximately a 1° arc increment along the ray (block 126). If the computed test point coordinate extends off the edge of the visual field or into the fixation point it is apparent that an error has resulted or a large visual field defect exists. Such an error could be caused by the fixation of the patient being inadequate to perform a blind spot map or the patient's focus or attentiveness failing. A test to determine this is performed (block 127) and if such an error has occurred blocks 128 and 129 indicate the remedy to be taken. The program then proceeds to point *b* of FIG. 8a.

If the computed test point is valid, it is presented to the subject (block 130) by calling the previously described joystick response and external equipment interface subprogram. Upon return from this program a test is performed (block 131) to determine if the spot was seen. If the spot was not seen it was in the blind spot and its coordinates are placed in the output array at block 132. In this case the program exits to continue the blind spot testing until all test rays are finished. If the spot was seen, it occurred just outside the edge of blind spot and its coordinates are placed in the main test point array for an accurate threshold determination at block 133. A flag is then set to indicate no more tests be performed on this ray (block 134) since the edge of the blind spot has been found along this ray. The program proceeds to b (shown in FIG. 8a).

At b (block 135) it is determined if both the horizontal and vertical meridians of the blind spot have been tested. If both meridians have been tested it is determined (block 136) if the actual center of the blind spot lies within an acceptable error margin from the predicted center. If the two centers do not correspond within acceptable limits a new horizontal meridian is computer based on the test data accumulated. The program logic previously discussed accomplishes this and the program exits to continue the blind spot test.

In the case where both horizontal and vertical meridians have not been tested and where the actual center of the blind spot corresponds within acceptable limits to the predicted center the program exits to continue the blind spot map. The blind spot map subprogram is complete when all rays have been tested.

It will be obvious to those skilled in the art that essentially the same process can be used for mapping disease scotomas which may be less dense than the normal blind spot. In such cases the brightness value of the test used for mapping the scotoma should be slightly dimmer than the threshold level in the scatoma.

If fixation is to be tested, as indicated by a test made at block 120, a test is made at block 119 to determine if the blind spot map is sufficient for fixation testing as some information as to the blind spot border must be available before the fixation test can be made meaningful. If the blind spot border is not adequately defined, the program exits to continue testing. If the blind spot is adequately defined, a test is presented, the patient's response or failure to respond is noted and a fixation quotient is completed (block 124). The program then exits.

Figure 11:
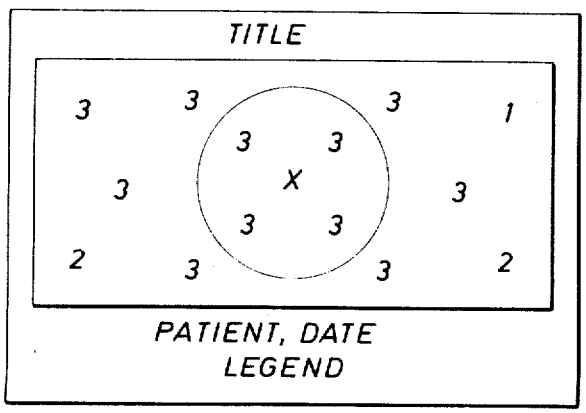
FIG. 11 illustrates one form of record or output from the system comprising a short form visual field display.
Figure 12:
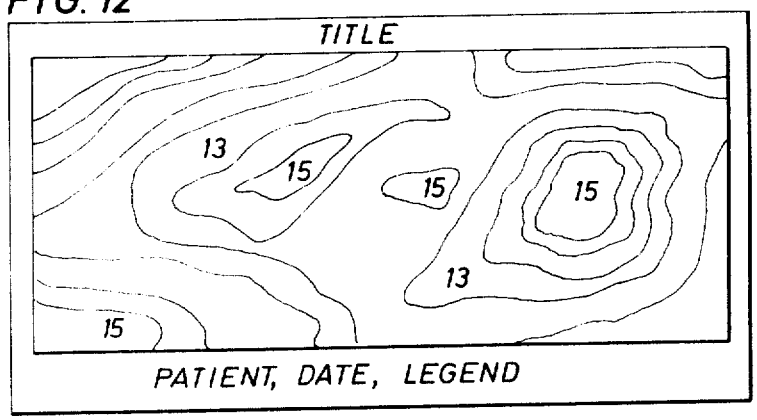
FIG. 12 illustrates a complete visual field display as output from the system in the form of an isopter plot.

Referring now to FIGS. 10, 11 and 12 when the entire input array of test points have been examined and the threshold value of each determined, an output program whose logic flow is illustrated in FIG. 10 is called to record the data in useable form. A form which has been found to be particularly useful is a graphical plotter display. Such a graphical plotter may produce a complete visual field plot with isopters as shown in FIG. 12 if data points are utilized the isopter lines connect visual field points having the same threshold. On the other hand, a very short visual field display having only a few data points is sometimes desirable as shown in FIG. 11. This type of short visual field display is useful for such purposes as drivers license test or for a quick scan search for a visual defect or scotoma in a particular area of the visual field.

The program of FIG. 10 first determines (block 140) if there is a short visual field test to display. If such a plot is to be performed, (block 141) the data is plotted in the format shown in FIG. 11. Here the numbers indicate the threshold at each individual test point of the examination. A title is provided at the top of the display and the subject's name, date of the test, and other pertinent data are presented in a legend at the lower portion. For example, in the plot of FIG. 11, a typical legend might read that the angular arc covered by the circle is 5°. Of course, it will be apparent that if a large number of test points are used that this type display would be impractical because of cluttering.

If a short visual field test is not to be displayed, a test is made at block 144 to determine if a complete visual field with isopter display is to be done. If there is a complete visual field with isopters to be displayed a visual field map such as illustrated in FIG. 12 is drawn (block 145). A display of this type may be of substantial interest to the examiner to locate visual field abnormalities. This type display also may be utilized for interpreting or following the progress of treatment of a visual disease.

It will be appreciated by those skilled in the art that the above description may be suggestive of alternative approaches which may be used in the visual field testing of a subject but which would fall under the concepts of the present invention in its broader aspects. It is therefore the object of the appended claims to cover all such changes and modifications which may be made without departing from the true spirit and scope of the invention.

We claim:

1. Apparatus for testing the visual field of a subject comprising:

means for presenting under machine control at selected locations on a test field at test point locations selected from a test array momentary, stationary spots of light, each having a stimulus value selected from a group of discrete stimulus values;

subject response means manually operable by the subject for providing an output indicating the sector relative to a fixation point on the test field in which the subject indicates a spot was perceived; and means, responsive to the output of said subject response device for automatically determining whether the subject correctly perceived a given spot presented on the test field by determining if said given spot was presented within n sectors of the sector indicated by the output of the subject response device, where n is an integer;

said means for presenting further including means for presenting at said selected locations additional momentary, stationary spots of light of selected stimulus values until, for each location, a threshold value is detected at each location at which any spot presented correctly perceived or a spot of maximum stimulus value selected from said group is presented at locations at which no spot was correctly perceived.

2. The apparatus of claim 1 further including means for displaying an appropriate symbol at each test location where no spot was correctly perceived and an appropriate symbol identifying the threshold value of stimulus perceived at each test location where a spot was correctly perceived.

3. The apparatus of claim 1 further including means for dynamically varying the sequence of presentation of said spots in response to the subject's perception history of stimuli at the test locations.

4. The apparatus of claim 1 further including lens means for correcting any refractive error of the eye of the subject being tested.

5. The apparatus of claim 1 further including means for controlling said presentation means to space from each other in time the presentation of said spots at a particular test location sufficiently to substantially overcome the effects of retainal bleaching.

6. The apparatus of claim 1 further including means for automatically determining which eye of the subject is being tested and means responsive to such determination for establishing the coordinates of test locations in the test field.

7. The apparatus of claim 1 further including means for applying to the subject an indication of correct response if a spot is correctly perceived and an indication of incorrect response if a spot is incorrectly perceived.

8. The apparatus of claim 1 further including:
means for recording an indication of spots presented as being perceived if the subject's response was correct and an indication of spots presented as not being perceived if the subject failed to respond within a pre-selected time interval or responded incorrectly;
means for removing from the test array those test points which have been tested at the maximum stimulus value without being perceived by the subject, those test points which have been tested at the minimum stimulus value and which were perceived by the subject, and those test points which have been tested at a threshold level correctly perceived by the subject; and
means for controlling the stimulus value of presented spots of light in accordance with the recorded indication until all test points are removed from the test array.

9. The apparatus as defined in claim 1 further including means for determining whether the tested threshold for each point is close to a predicted threshold for said point.

10. The apparatus as defined in claim 1 wherein said presenting means includes means for controlling the stimulus value of the first spot presented at a test point to be of a stimulus value of a predicted threshold level.

11. The apparatus as defined in claim 1 further including means for determining the presence of a scotoma, and wherein said presenting means includes means for presenting additional test points in the vicinity of the scotoma, which test points are not in the original test array, to thereby determine the extent of the scotoma.

12. The apparatus as defined in claim 11 wherein said scotoma determining means includes means for indicating the presence of a scotoma if it is determined that a significant deviation exists between a predicted threshold level and a tested threshold level at a test point in the original test array.

13. The apparatus as defined in claim 11 wherein said additional test point presenting means includes means for presenting spots along a first line passing through the test point indicating a scotoma and extending at least to opposite boundaries of the scotoma to thereby determine the extent of the scotoma along said line, means for presenting additional test points along a second line extending at least to opposite boundaries of the scotoma and which is normal to the first line and passes through a point on the first line which is midway through the portion of the first line bounded by the scotoma, and means for presenting additional test points along rays extending at least to the boundary of the scotoma from a point on the second line which is midway through the portion of the second line bounded by the scotoma.

* * * * *